United States Patent [19]

Yoshida

[11] Patent Number: 5,321,671

[45] Date of Patent: Jun. 14, 1994

[54] RADIO RECEIVER WITH TAPE DECK HAVING INTERRUPT CAPABILITY

[75] Inventor: Shigehiro Yoshida, Sanda, Japan

[73] Assignee: Mitsubishi Denki Kabushiki Kaisha, Tokyo, Japan

[21] Appl. No.: 919,236

[22] Filed: Jul. 27, 1992

[30] Foreign Application Priority Data

Jul. 31, 1991 [JP] Japan .................... 3-191983

[51] Int. Cl.$^5$ .............................. H04B 1/20
[52] U.S. Cl. ................................ 369/6; 369/10; 369/2; 351/86; 360/137
[58] Field of Search .................. 369/6, 10, 31, 2; 381/86; 360/1, 137

[56] References Cited

U.S. PATENT DOCUMENTS 5,073,943 12/1991 Chapman ................. 381/86

FOREIGN PATENT DOCUMENTS 1-93689 6/1989 Japan .

OTHER PUBLICATIONS

R. Laugisch; Zwei Empfanger in einem Gerat—das neue Grundig Cassetten-Autoradio WKC 2960 VD Infomat; 1985, Issue 2/3, pp. 99–108.

Primary Examiner—Robert J. Pascal
Assistant Examiner—Reginald A. Ratliff

[57] ABSTRACT

Occurrence of mechanical noise and tape damage due to operation of a pinch roller is avoided when the system is switched from the tape playback mode to the radio mode or vice versa. On playback of the tape, an interrupt signal 33 from a microcomputer 34 is low. Transistors 28 and 13 are thus turned on. A drive motor 14 in the tape deck 11 is energized by power from a (+B) terminal 45. When the cassette tape is loaded into the tape deck, a plunger 15 is energized directly by power from a (TAPE+B) terminal 12. Thus, a pinch roller 41 in a head drive mechanism 16 is brought into contact with the tape 43. If the microcomputer 34 detects any interrupt signal such as traffic or emergency information signals multiplexed with FM broadcasting waves, it changes the interrupt signal to high so that the transistors 28 and 13 are turned off. Therefore, the drive motor 14 is de-energized, but the power continues to be supplied to the plunger 15. Consequently, the pinch roller 41 and the tape 43 will be maintained in contact with each other and will not influenced by the switching between the tape and radio modes.

16 Claims, 3 Drawing Sheets

RADIO RECEIVER WITH TAPE DECK HAVING INTERRUPT CAPABILITY

BACKGROUND OF THE INVENTION

1. Field of the Invention:

The present invention relates to a radio receiver and particularly to a radio receiver containing a cassette tape deck therein.

2. Description of the Related Art:

Many car or domestic radio receivers include a cassette tape deck contained therein so that a user can easily play back cassette tapes in addition to radio broadcastings. Recently, multi-functional radio receivers have been developed. For example, a radio receiving system has been now developed which has a radio broadcasting interrupt function for offering a radio broadcast announcing traffic or emergency information during the playing-back of a tape, if necessary. This is accomplished by transmitting broadcasting waves containing an interrupt signal which is multiplexed with general broadcasting waves and by receiving and demodulating them into the desired radio broadcast, in accordance with an FM multiplex broadcasting technique such as RDS.

FIG. 2 is a block diagram illustrating the primary parts of a radio receiver with a tape deck which is constructed in accordance with the related art. The radio receiver comprises a tape deck 11 which is adapted to detect the insertion of a cassette tape (not shown) thereinto and to be actuated by electric power supplied from a (TAPE+B) terminal 12 to the tape deck 11 through a transistor 13. The collector of the transistor 13 is connected with a drive motor 14 and plunger 15 in the tape deck 11. The plunger 15 is connected with a head drive mechanism 16 which in turn is connected with a head 17. On powering on, a head holding latch (not shown) in the head drive mechanism 16 is actuated to hold the head 17 in contact with the tape. Playback signals outputted from the head 17 are fed to a radio/tape output switching circuit 22 through an equalizer circuit 21 and then outputted from a speaker 24 through an amplifying circuit 23.

The emitter of the transistor 13 is connected with the (TAPE+B) terminal 12 through a drive resistor 26 while the base thereof is connected to the emitter through a resistor 29 and also to the collector of a transistor 28 through a drive resistor 27.

The emitter of the transistor 28 is grounded with the base thereof being grounded through a resistor 31. The base of the transistor 28 is also connected with the interrupt signal output terminal of a microcomputer 34. The interrupt signal outputted from the interrupt signal output terminal is a negative logic (active "L") signal which is inputted to the base of the transistor 28 and also to the radio/tape output switching circuit 22. The radio/tape output switching circuit 22 selects either the cassette tape signal or the radio reception signal, depending on the logical level of the interrupt signal 33.

In the apparatus, the radio receiver further comprises a radio receiving circuit 37 which includes various conventional circuits such as a high-frequency amplifier, a local oscillator, a mixer, an intermediate frequency amplifier, a detector, a noise killer, a multiplexer and so on. The radio receiving circuit 37 provides radio waves containing FM broadcast signals and the like received by an antenna 38 to the radio/tape output switching circuit 22 and at the same time feeds data multiplexed with the FM broadcast signals to a data demodulating circuit 39. The data demodulating circuit 39 demodulates the data, the demodulated data being outputted therefrom to the microcomputer 34.

On operation, the electric power is applied to the transistor 13 through the (TAPE+B) terminal 12 when a cassette tape is inserted into the tape deck 11 through its tape inlet (not shown). Since at this time, the active "L" interrupt signal 33 from the microcomputer 34 is in a "H" state in the tape signal prefered mode, the transistors 28 and 13 are also turned on to energize the drive motor and plunger 14, 15. At the same time as the drive motor 14 is actuated, the head holding latch of the head drive mechanism 16 is actuated to bring the head 17 into contact with the tape. Tape voice signals read out from the cassette tape are supplied to the radio/tape output switching circuit 22 through the equalizer circuit 21.

When the radio/tape output switching circuit 22 senses the tape voice preferential mode "H" in the interrupt signal 33, the circuit 22 selects the tape voice signals from the equalizer circuit 21 which in turn are outputted therefrom to the amplifying circuit 23 to drive the speaker 24.

If the traffic or emergency information signals multiplexed with the FM broadcasting signals are received during such a playback of tape voice signals, these multiplexed signals are demodulated by the data demodulating circuit 39 after being received by the radio receiving circuit 37 through the antenna 38. The demodulated signals are received by the microcomputer 34 which in turn changes the interrupt signal 33 from "H" to "L". Thus, the transistors 28 and 13 are turned off to shut off the power to the drive motor and plunger 14, 15. At the same time as the drive motor 14 is stopped, the head drive mechanism 16 is unlatched to move the head 17 away from the tape.

As the interrupt signal 33 is changed to "L", the system is switched from the tape voice prefered mode to the radio voice prefered mode. In other words, the radio/tape output switching circuit 22 selects the radio receiving circuit 37 to cause the received traffic or emergency information signals to be output through the speaker.

On termination of the transmission of traffic or emergency information signals, this is sensed by the microcomputer 34 which changes the interrupt signal 33 back to "H" so that the tape voice prefered mode will be selected.

FIGS. 3 and 4 illustrate the relationship between tape, capstan and pinch roller in the tape desk 11. In the tape voice prefered mode, the head holding latch of the head drive mechanism 16 (FIG. 1) is held by the plunger 15 (FIG. 1) such that the tape 43 is nipped between the pinch roller 41 and the capstan 42, as shown in FIG. 3. This will be referred to as the "pinching-on state".

In the radio voice prefered mode, the tape 43 is released between the pinch roller 41 and the capstan 42 as shown in FIG. 4 since the plunger 15 is deenergized. This will be referred to as the "pinching-off state".

In the related art radio receiver with the tape deck, thus, both the drive motor and plunger 14, 15 are deenergized when the system is shifted to the radio voice prefered mode due to the interrupt caused by traffic or emergency information signals. If the traffic or emergency information signals are unstably received by the radio receiver in a bad radio wave reception area such as between mountains, the interrupt signal 33 from the microcomputer 34 will be frequently changed from "H" to "L" or vice versa. Thus, the plunger 15 will be frequently energized and deenergized. This results in frequent repetition of the pinching-on and pinching-off states. As a result, mechanical noise will be undesirably generated and the tape will eventually be damaged.

It is therefore an object of the present invention to provide an improved radio receiver with tape deck which can prevent the occurrence of undesirable mechanical noise and also tape damage due to the frequent switching between the radio and tape prefered modes.

SUMMARY OF THE INVENTION

To this end, the present invention provides a radio receiver comprising a tape deck having (a) a drive motor for driving a cassette tape; (b) a roller-capstan mechanism including a pinch roller and a capstan, the mechanism being adapted to guide the cassette tape nipped between the pinch roller and capstan on recording and reproducing of audio signals to and from a cassette tape; (c) a head brought into contact with the tape to record and reproduce the audio signals when the tape is nipped between the pinch roller and the capstan; (d) a plunger for actuating a head holding latch to move the pinch roller to a pinching-on state in which the tape is nipped between the pinch roller and the capstan when the plunger is energized and for releasing the head holding latch to move the pinch roller to a pinching-off state in which the tape is released between the pinch roller and the capstan when the plunger is deenergized, and the radio receiver further comprising (e) a radio receiving circuit for receiving broadcast waves including interrupting signals such as traffic and emergency information signals; (f) a demodulating circuit for demodulating the broadcasted waves received by the radio receiving circuit; (g) an interrupt signal detecting circuit for detecting the interrupt signal from the signals demodulated by the demodulating circuit; (h) an output switching circuit for outputting radio voice signals from the radio receiving circuit when audio playback signals are outputted from the tape deck and if any interrupt signal is detected by the interrupt signal detecting circuit; and (i) a first power terminal for supplying electric power to the plunger in the event of a cassette tape being loaded into the tape deck, irrespective of the state of the output switching circuit.

In such an arrangement, the plunger is maintained energized even if the system is switched to the radio voice signal output mode by the detection of an interrupt signal. Thus, the pinch roller and capstan will not be frequently moved into contact and non-contact with the tape even if the system is frequently switched from the tape playback mode to the radio voice signal output mode and vice versa. This can prevent the occurrence of mechanical noise and also tape damage.

In one aspect of the present invention, a microcomputer may be used as the interrupt signal detecting circuit.

In another aspect of the present invention, the first power terminal may be powered on only when the cassette tape is loaded into the tape deck.

In still another aspect of the present invention, the drive motor may be connected with the power supply through a second power terminal distinct from the first power terminal.

In a further aspect of the present invention, the second power terminal may be connected with the power supply only when the cassette tape is loaded into the tape deck and an interrupt signal is not detected.

In a further aspect of the present invention, the radio receiver may further comprise (j) a first transistor maintained "OFF" when it does not receive an interrupt signal from the interrupt signal detecting circuit, (k) a second transistor turned on when the first transistor is in its "OFF" state and a voltage is applied to the first power terminal, and (l) a third transistor turned on when the second transistor is turned on, whereby the drive motor can be energized through the second power terminal when the third transistor is in its "ON" state.

DETAILED DESCRIPTION OF THE PREFERRED EMBODIMENTS

Figure 1:
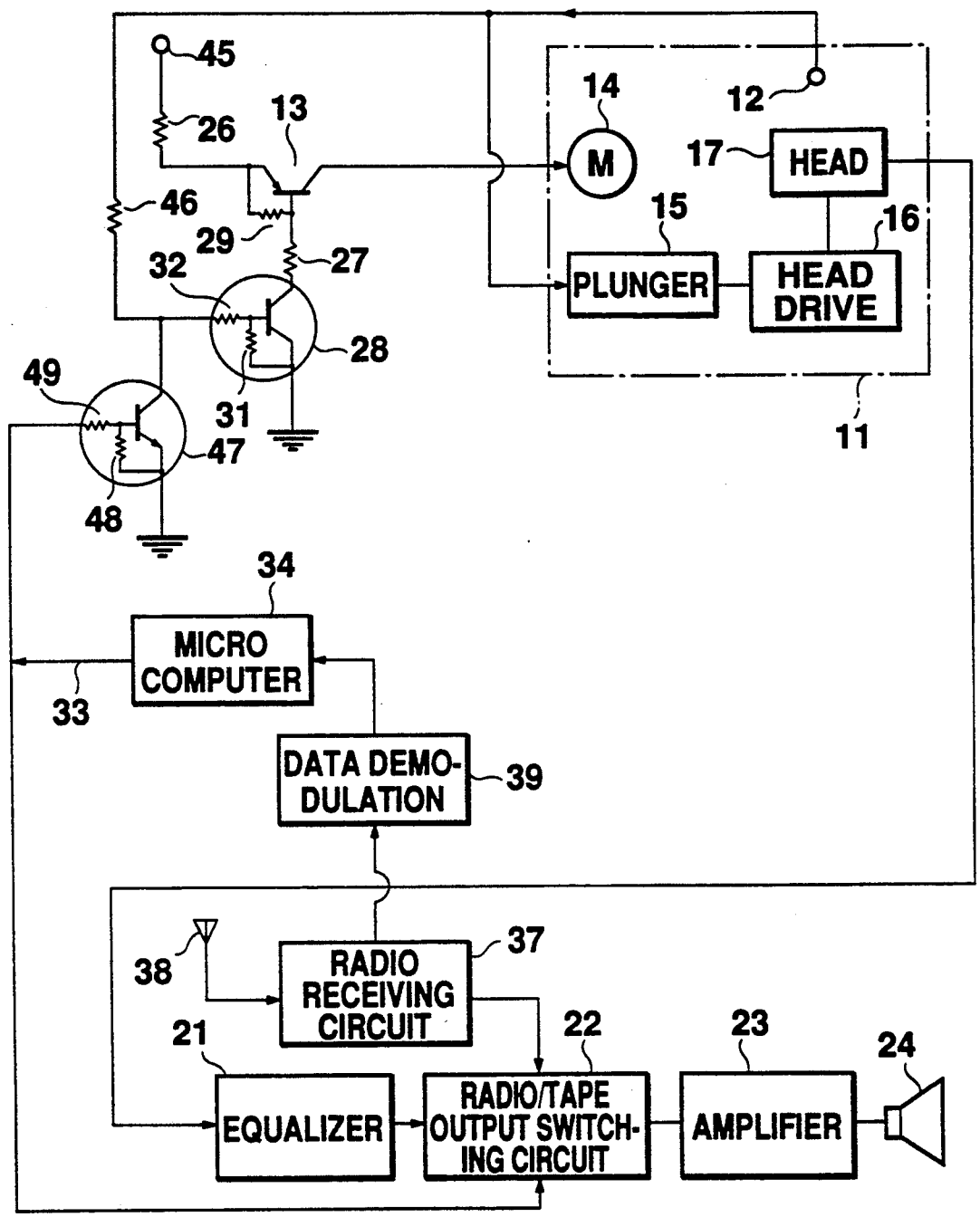
FIG. 1 is a block diagram illustrating one embodiment of a radio receiver with tape deck constructed in accordance with the present invention.
Figure 2:
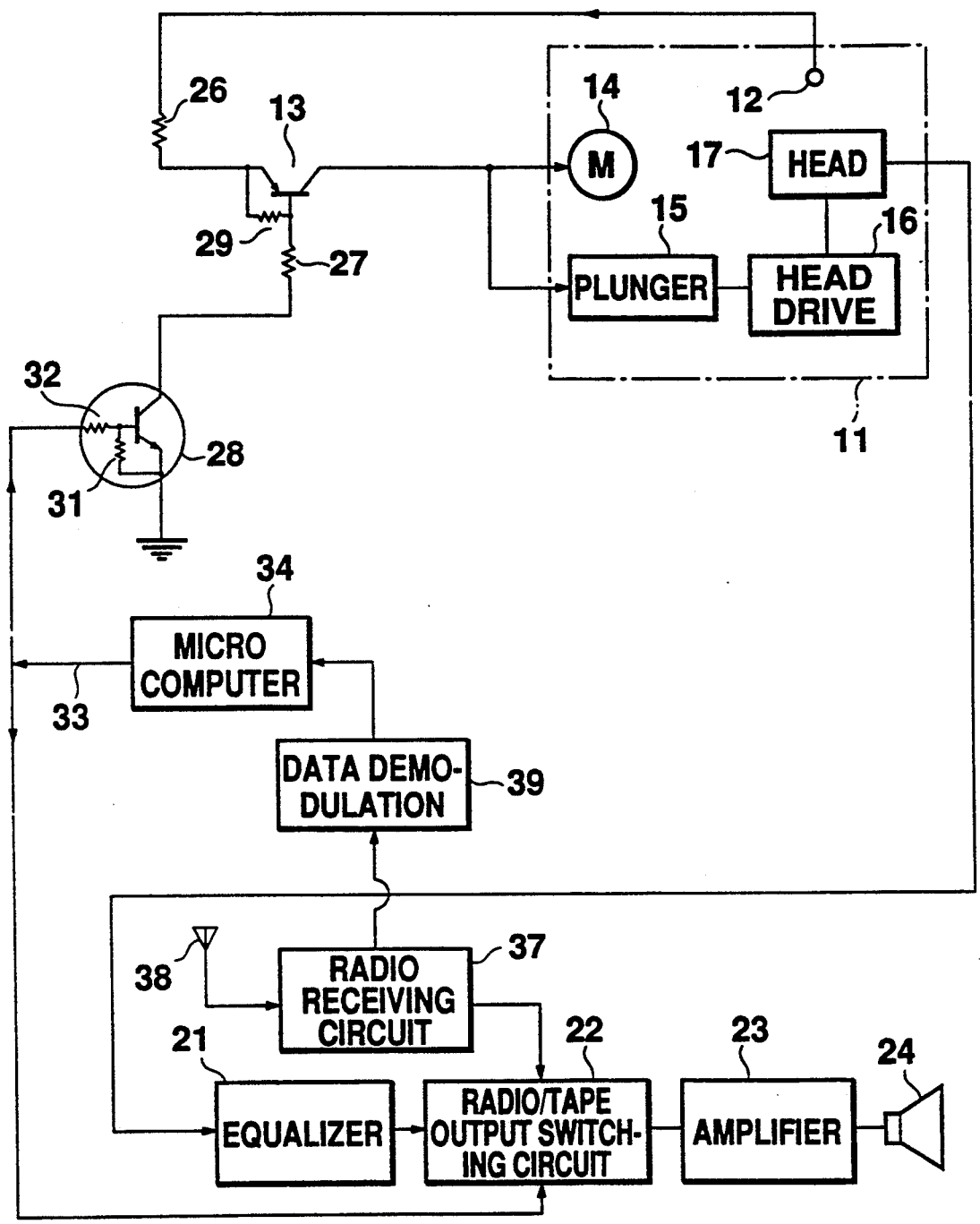
FIG. 2 is a block diagram illustrating a radio receiver with tape deck constructed in accordance with the related art.

FIG. 1 shows one embodiment of a radio receiver with tape deck constructed in accordance with the present invention, in which parts similar to those of FIG. 2 are denoted by similar reference numerals and some parts will not be further described herein. The radio receiver comprises a (+B) terminal 45 functioning as a second power terminal to which a power voltage will be applied when a switch (not shown) is switched on. The (+B) terminal 45 is connected with the emitter of the transistor 13 through the drive resistor 26. The collector of the transistor 13 is connected with the drive motor 14 of the tape deck 11. The base of the transistor 13 is connected with the emitter of the same through the resistor 29 and also with the collector of the transistor 28 through the drive resistor 27.

A transistor 47 includes an emitter connected to ground and a base connected to ground through a resistor 48 and also to the interrupt signal output terminal of the microcomputer 34 through a resistor 49. The interrupt signal 33 outputted from this interrupt signal output terminal is a positive (active "H") signal which is also inputted to the radio/tape output switching circuit 22. The radio/tape output switching circuit 22 selects one of the tape and radio voice modes depending on the logical level of the interrupt signal 33 ("L" or "H"). The remainder of the arrangement is similar to that of FIG. 2.

On operation, a when a cassette tape is inserted into the tape deck 11 through its tape inlet (not shown), a voltage is applied to the (TAPE+B) terminal 12. When the switch of the radio receiver is switched on, a voltage is applied to the (+B) terminal 45.

Figure 3:
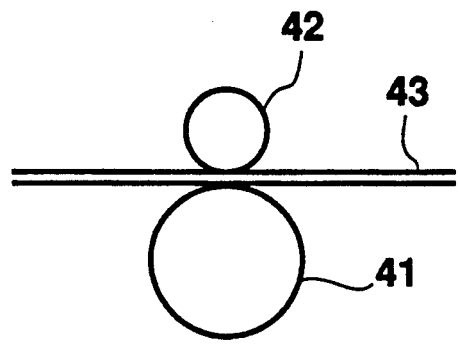
FIG. 3 illustrates a pinching-on state in the tape deck.
Figure 4:
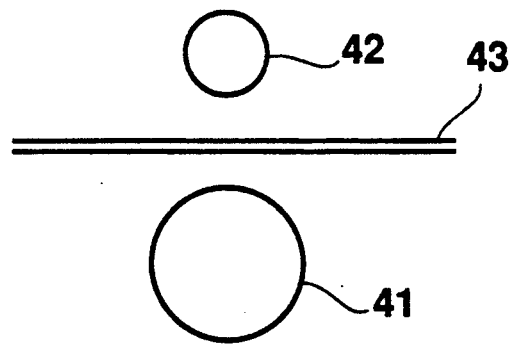
FIG. 4 illustrates a pinching-off sate in the tape deck.

In the tape voice playback mode, the active "H" interrupt signal 33 from the microcomputer 34 is at a "L" level. The transistor 47 is thus turned off. As a result, the transistors 28 and 13 are turned on so that the power is supplied from the (+B) terminal 45 to the drive motor 14 to drive the tape. At this time, the plunger 15 is energized by the power from the (TAPE+B) terminal 12 to hold the latch of the head drive mechanism 16 so that the head 17 becomes ON. As a result, the relationship between the tape, capstan and pinch roller in the tape deck 11 is shifted into the pinching-on state shown in FIG. 3. Tape voice signals output from the cassette tape are fed to the radio/tape output switching circuit 22 through the equalizer circuit 21.

Since the interrupt signal 33 is in its "L" state representing the tape voice prefered mode, the radio/tape output switching circuit 22 selects the tape voice signals from the equalizer circuit 21, which are then amplified by the amplifying circuit 23 and outputted through the speaker 24.

If FM broadcasting waves multiplexed with traffic or emergency information signals are transmitted during the tape voice playback, they are received by the antenna 38. The received signals are then provided to the data demodulating circuit 39 through the radio receiving circuit 37. After being demodulated at the data demodulating circuit 39, the signals are inputted to the microcomputer 34. On reception, the microcomputer 34 changes the interrupt signal 33 to the "H" state. The transistor 47 is thus turned on and the transistors 28 and 13 are turned off. Therefore, the drive motor 14 is deenergized and stopped. Unlike the prior art, the plunger 15 is maintained energized by another power source distinct from the power source for the driving motor 14. Therefore, the plunger 15 can hold the head drive mechanism 16 latched to maintain the pinching-on state shown in FIG. 3.

On the other hand, the system is shifted to the radio voice preferred mode since the interrupt signal 33 has been changed to "H". The radio/tape output switching circuit 22 selects the radio receiving circuit 37 such that the traffic or emergency information signals received by the radio receiving circuit 37 will be outputted from the speaker.

As the transmission of the traffic or emergency information signals is terminated, this is sensed by the microcomputer 34 which changes the interrupt signal 33 back to "L", such that the system will be again placed in the tape voice prefered mode.

In accordance with the present invention, mechanical noise and impact on the tape can be avoided even if the system is frequently switched from the radio voice prefered mode to the tape voice prefered mode and vice versa, since the pinching state is maintained throughout operation of the radio receiver.

Although the present invention has been described as to the car radio receiver, it is to be understood that the present invention is not limited to the car radio receiver and may be similarly applied to conventional domestic radio receivers or radio-cassette sets.

It is further to be understood that any suitable interrupt signal other than the traffic or emergency information signals such as RDS may be used in the present invention with similar advantages.

I claim:

1. A radio receiver with tape deck, comprising:
a tape deck having:
 (a) a drive motor for driving a cassette tape;
 (b) a roller-capstan mechanism including a pinch roller and a capstan, said mechanism being adapted to guide the cassette tape nipped between said pinch roller and capstan on recording and reproducing of audio signals to and from a cassette tape;
 (c) a head brought into contact with the tape to record and reproduce the audio signals when the tape is nipped between the pinch roller and the capstan;
 (d) a plunger for actuating a head holding latch to move the pinch roller to a pinching-on state in which the tape is nipped between the pinch roller and the capstan when said plunger is energized and for releasing said head holding latch to move the pinch roller to a pinching-off state in which the tape is released from between the pinch roller and the capstan when said plunger is deenergized, and
said radio receiver further comprising:
 (e) a radio receiving circuit for receiving broadcast waves including interrupt signals such as traffic and emergency information signals;
 (f) a demodulating circuit for demodulating the broadcast waves received by said radio receiving circuit;
 (g) an interrupt signal detecting circuit for detecting the interrupt signal from the signals demodulated by said demodulating circuit;
 (h) an output switching circuit for outputting radio voice signals from said radio receiving circuit if any interrupt signals are detected by said interrupt signal detecting circuit; and
 (i) a first power terminal for supplying electric power to said plunger in the event of a cassette tape being loaded into the tape deck, irrespectively of the state of said output switching circuit.

2. A radio receiver with tape deck as defined in claim 1 wherein said interrupt signal detecting circuit includes a microcomputer.

3. A radio receiver with tape deck, comprising:
a tape deck having:
 (a) a drive motor for driving a cassette tape;
 (b) a roller-capstan mechanism including a pinch roller and a capstan, said mechanism being adapted to guide the cassette tape nipped between said pinch roller and capstan on recording and reproducing of audio signals to and from a cassette tape;
 (c) a head brought into contact with the tape to record and reproduce the audio signals when the tape is nipped between the pinch roller and the capstan;
 (d) a plunger for actuating a head holding latch to move the pinch roller to a pinching-on state in which the tape is nipped between the pinch roller and the capstan when said plunger is energized and for releasing said head holding latch to move the pinch roller to a pinching-off state in which the tape is released from between the pinch roller and the capstan when said plunger is de-energized, and
said radio receiver further comprising:
 (e) a radio receiving circuit for receiving broadcast waves including interrupt signals such as traffic and emergency information signals;
 (f) a demodulating circuit for demodulating the broadcast waves received by said radio receiving circuit;
 (g) an interrupt signal detecting circuit for detecting the interrupt signal from the signals demodulated by said demodulating circuit;
 (h) an output switching circuit for outputting radio voice signals from said radio receiving circuit when audio playback signals are outputted from said tape deck and if any interrupt signals are detected by said interrupt signal detecting circuit; and (i) a first power terminal for supplying electric power to said plunger in the event of a cassette tape being loaded into the tape deck, irrespectively of the state of said output switching circuit, wherein a voltage is applied to said first power terminal only in the tape playback mode when the tape is loaded into the tape deck.

4. A radio receiver with tape deck as defined in claim 3 wherein said drive motor is energized by another electric power from a second power terminal distinct from said first power terminal.

5. A radio receiver with tape deck as defined in claim 4 wherein said second power terminal receives a voltage only when the tape is loaded into said tape deck and if said interrupt signal is not detected by said interrupt signal detecting circuit.

6. A radio receiver with tape deck as defined in claim 5, further comprising (j) a first transistor maintained at its "OFF" state when there is no interrupt detection signal from said interrupt signal detecting circuit; (k) a second transistor turned on when said first transistor is in its "OFF" state and the voltage is applied to said first power terminal; and (l) a third transistor turned on when said second transistor is turned on, whereby the power can be supplied from said second power terminal to said drive motor when said third transistor is turned on.

7. A radio receiver in combination with a tape deck, comprising:
a tape deck including,
a drive motor for driving a cassette tape;
a pinch roller and a capstan adapted to guide the cassette tape nipped between said pinch roller and capstan;
a head, brought into contact with the tape to reproduce audio signals;
plunger means for moving the pinch roller to nip the tape between the pinch roller and the capstan when said plunger means is in an energized state and for moving the pinch roller to release the tape from between the pinch roller and the capstan when said plunger means is in a de-energized state, and
a radio receiver including:
a radio receiving circuit for receiving broadcast signals including interrupt signals;
a demodulating circuit for demodulating said broadcast signals;
an interrupt signal detecting circuit for detecting an interrupt signal from the demodulated broadcast signals;
an output switching circuit for outputting radio signals derived from said demodulated broadcast signals when said interrupt signal is detected by said interrupt signal detecting circuit; wherein
said plunger means maintains said energized state when said output switching circuit outputs said radio signals derived from said demodulated broadcast signals.

8. The radio receiver in combination with a tape deck as defined in claim 7 wherein said interrupt signal detecting circuit includes a microcomputer.

9. The radio receiver in combination with a tape deck as defined in claim 7 wherein said plunger means is energized only when a tape is loaded into said tape deck.

10. The radio receiver in combination with a tape deck as defined in claim 9 wherein said plunger and said drive motor are energized by first and second power terminals respectively.

11. The radio receiver in combination with a tape deck as defined in claim 10 wherein said second power terminal receives a voltage only when a tape is loaded into said tape deck and when said interrupt signal is not detected by said interrupt signals detecting circuit.

12. The radio receiver in combination with a tape deck as defined in claim 11, further comprising a first transistor maintained at its "OFF" state when there is no interrupt detection signal from said interrupt signal detecting circuit; a second transistor turned on when said first transistor is in its "OFF" state and voltage is applied to said first power terminal; and a third transistor turned on when said second transistor is turned on, whereby power is supplied from said second power terminal to said drive motor when said third transistor is turned on.

13. A method for operating a radio receiver in combination with a tape deck, the tape deck including a drive motor, a pinch roller, a capstan, a head, and a plunger, the method comprising:

(a) receiving broadcast signals including interrupt signals;
(b) demodulating said broadcast signals;
(c) detecting an interrupt signal from the demodulated broadcast signals;
(d) driving a cassette tape with said drive motor;
(e) guiding said tape between said pinch roller and said capstan;
(f) contacting said tape with said head to reproduce audio signals;
(g) energizing the plunger to move the pinch roller to nip the tape between the pinch roller and the capstan;
(h) maintaining energizing said plunger when said interrupt signal is detected in step (c); and
(i) outputting radio signals derived from said demodulated broadcast signals when said interrupt signal is detected in step (c).

14. The method of claim 13 further including the step of loading a tape into said tape deck; and step (g) and step (h) are performed only when said tape is loaded into said tape deck.

15. An apparatus for operating a radio and tape player comprising:
a drive motor for driving a tape;
a pinch roller and a capstan for guiding the tape; a head;
means for receiving broadcast signals including interrupt signals;
detecting means for demodulating the broadcast signals;
detecting means for detecting an interrupt signal from the demodulated broadcast signals;
means for contacting the tape with said head to reproduce audio signals;
moving means for moving said pinch roller to nip the tape between said pinch roller and said capstan and for maintaining the tape to be nipped between said pinch roller and said capstan when the interrupt signal is detected by said detecting means; and
means for outputting radio signals derived from the demodulated broadcast signals when the interrupt signal is detected by said detecting means.

16. The apparatus of claim 15 further including means for determining whether a tape is loaded into said tape deck and outputting an output signal in response to the determination; and wherein
said moving means is responsive to the output signal.

* * * * *